United States Patent
Bruder et al.

(10) Patent No.: US 10,189,338 B2
(45) Date of Patent: Jan. 29, 2019

(54) FOLDING TOP FOR A CABRIOLET VEHICLE

(71) Applicant: Magna Car Top Systems GmbH, Bietigheim-Bissingen (DE)

(72) Inventors: Gernot Bruder, Karlsruhe (DE); Tobias Kober, Ditzingen (DE); Metodi Kostadinov, Bietigheim-Bissingen (DE); Christian Soergel, Stuttgart (DE); Reinhard Suess, Gundelsheim (DE)

(73) Assignee: MAGNA Car Top Systems GmbH, Bietigheim-Bissingen (DE)

( * ) Notice: Subject to any disclaimer, the term of this patent is extended or adjusted under 35 U.S.C. 154(b) by 200 days.

(21) Appl. No.: 15/357,215

(22) Filed: Nov. 21, 2016

(65) Prior Publication Data

US 2017/0203641 A1    Jul. 20, 2017

(30) Foreign Application Priority Data

Dec. 11, 2015   (DE) .......................... 10 2015 224 989

(51) Int. Cl.
*B60J 7/12*    (2006.01)
*B60J 1/18*    (2006.01)

(52) U.S. Cl.
CPC ........... *B60J 7/1273* (2013.01); *B60J 1/1815* (2013.01); *B60J 7/1204* (2013.01); *B60J 7/1239* (2013.01); *B60J 7/1247* (2013.01); *B60J 7/1265* (2013.01)

(58) Field of Classification Search
CPC ...... B60J 7/1247; B60J 7/1204; B60J 7/1273; B60J 7/1265; B60J 1/1815
USPC ........................................ 296/107.07, 107.09
See application file for complete search history.

(56) References Cited

U.S. PATENT DOCUMENTS

| | | | | |
|---|---|---|---|---|
| 5,816,644 A | * | 10/1998 | Rothe | ..... B60J 7/1265 296/107.18 |
| 7,581,776 B2 | * | 9/2009 | Quindt | ..... B60J 7/1265 296/107.09 |
| 2008/0265612 A1 | * | 10/2008 | Quindt | ..... B60J 7/1265 296/108 |
| 2012/0025562 A1 | * | 2/2012 | Beierl | ..... B60J 7/1265 296/108 |

FOREIGN PATENT DOCUMENTS

| | | |
|---|---|---|
| DE | 102007041296 A1 | 3/2009 |
| DE | 202011101132 U1 | 7/2011 |
| DE | 102013108730 A1 | 2/2015 |
| DE | 102014106266 A1 | 11/2015 |

* cited by examiner

*Primary Examiner* — Jason S Morrow
(74) *Attorney, Agent, or Firm* — Jordan IP Law, LLC; Todd A. Vaughn

(57) ABSTRACT

A folding top for a cabriolet vehicle, and which includes a top linkage and a top cover. The top linkage may be adjusted for movement between a closed position and an open position via a roof kinematic system. The roof kinematic system is configured as a four-bar linkage kinematic system having a first link, a second link, and a drive member to drive the first link.

17 Claims, 2 Drawing Sheets

FOLDING TOP FOR A CABRIOLET VEHICLE

CROSS-REFERENCE TO RELATED APPLICATIONS

The present application claims priority 35 U.S.C. § 119 to German Patent Publication No. DE 10 2015 224 989.1 (filed on Dec. 11, 2015), which is hereby incorporated by reference in its entirety.

TECHNICAL FIELD

Embodiments relate to a folding top for a cabriolet vehicle, the folding top including a top linkage and a top cover. The top linkage is configured for movement between a closed position and an open position via a roof kinematic system. The roof kinematic system is configured as a four-bar linkage kinematic system, and includes a first link, a second link, a drive member to adjustably move the first link, and a tensioning hoop which is assigned to the top linkage.

BACKGROUND

Folding tops for cabriolet vehicles are known in different design variants, and as a rule, close a roof opening which protrudes along the vehicle roof as far as into the rear region. The folding top is configured such that it may be moved via a top linkage between an open position and a closed position in such a way that the folding top is stowed in a rear-side storage space in the open position. The folding top comprises a top linkage with a multiplicity of links, bows and hoops. A top cover is supported by the top linkage, which top cover spans the vehicle interior space in the closed position. The top linkage also comprises a tensioning hoop, on which the top cover is fixed on the rear side at the lower end region and which tensions the top cover in the closed position. The tensioning hoop is held on a tensioning hoop kinematic system and may be adjusted via the latter between its functional tensioning position which corresponds to the closed position of the folding top and a stowage position. In the stowage position of the tensioning hoop, the folding top is situated in the open position.

At the beginning of the stowing movement, the tensioning hoop may be moved from its tensioning position into a released position. In the released position, the tensioning hoop is raised up to such an extent that the tension of the top cover is cancelled and a rear flap which lies on the rear-side storage space may be lifted up. A storm linkage serves to secure the tensioning hoop in the tensioning position, via which storm linkage the tensioning hoop is supported on a component of the top linkage when the folding top is closed.

The adjustment of the tensioning hoop between the tensioning position and the stowage position via the tensioning hoop kinematic system takes place as a coupled movement of the movement of the folding roof. To this end, the tensioning hoop kinematic system is coupled to the roof kinematic system. During a movement of the roof kinematic system, the tensioning hoop likewise performs an adjusting movement. Via the tensioning hoop kinematic system, the tensioning hoop is attached firstly to the vehicle body and secondly to the roof kinematic system.

European Patent Publication No. EP 0 749 859 A1 has disclosed a folding top for a cabriolet vehicle, which folding top has a top linkage with a main drive. Furthermore, a tensioning hoop kinematic system is provided which comprises an upper storm rod, a lower storm rod and a tensioning hoop. The tensioning hoop kinematic system is assigned a separate drive member, the drive member being mounted on the vehicle body side and being configured as a hydraulic cylinder. A drive movement of the hydraulic cylinder is achieved via a swing arm which is mounted in a pivotably movable manner on the main bearing of the top linkage and is connected via a toggle lever to a tensioning lever in such a way that the upper storm rod may be moved towards the roof skin or away from it by way of the tensioning lever in accordance with the movement of the drive piston. Here, the lower storm rod is mounted on the tensioning hoop in such a way, and the front storm rod is mounted on the top linkage in such a way, that the tensioning hoop kinematic system may be moved independently of the main drive.

A disadvantage of the known embodiment of the roof kinematic system is, however, that the hydraulic cylinder which is assigned to the tensioning hoop kinematic system has to be switched to pressureless during the adjusting movement of the vehicle roof. Furthermore, the movement sequence during opening and closing of the vehicle roof is kinematically indeterminate.

SUMMARY

Embodiments relate to a cabriolet vehicle with a folding top including a top linkage and a top cover, and which is configured in such a way that the folding top follows a kinematically determinate movement sequence during an opening movement and a closing movement. The roof kinematic system is robust, and the folding top with associated hydraulic supply for the drive members may be realized inexpensively.

Embodiments relate to a folding top for a cabriolet vehicle, the folding top comprising a top cover and a top linkage moveable between a closed position and an open position via a roof kinematic system configured as a four-bar linkage kinematic system.

The roof kinematic system comprises a first link, a second link, a drive member to moveably adjust the first link, and a tensioning hoop assigned to the top linkage, wherein the tensioning hoop is mounted such that it is moveable via a tensioning hoop kinematic system.

In accordance with embodiments, the roof kinematic system is coupled to the tensioning hoop kinematic system in such a way that, during a movement of the roof kinematic system, the tensioning hoop performs an adjusting movement.

In accordance with embodiments, the tensioning hoop kinematic system comprises a guide link and a coupling link connected in an articulated manner to the second link of the four-bar linkage kinematic system.

In accordance with embodiments, at a first end region thereof, the guide link is connected to the coupling link via a bearing point in an articulated manner. At a second end region thereof the guide link is connected to the tensioning hoop via a bearing point in an articulated manner.

In accordance with embodiments, the top linkage has a storm linkage which is configured such that it is adjustably moveable via a control device between a locked position, in which the tensioning hoop is loaded by the storm linkage, and an unlocked position. The storm linkage comprises an upper storm rod and a lower storm rod which are connected to one another in an articulated manner via a bearing point.

In accordance with embodiments, the control device comprises a four-rod linkage and a drive member, the four-rod linkage having an upper toggle lever and a lower toggle lever which are connected to one another in an articulated manner via a bearing point. The upper toggle lever is connected in an articulated manner to the lower storm rod, and the lower toggle lever is connected in an articulated manner to the drive member. The lower toggle lever is additionally connected to the vehicle body in an articulated manner via a bearing point which is fixed to the vehicle body.

As a result of the combination of the features, it is possible to realize a folding top, in which a kinematically determinate movement sequence is possible.

A further advantage is providing in that, after the tensioning hoop has been set up, the tensioning hoop cylinder may also remain under pressure during the remaining adjusting movement of the folding top into the stowage position. As a result, an additional hydraulic actuating mechanism or device and a corresponding valve may be dispensed with.

In accordance with embodiments, the lower toggle lever is fastened on the top bearing at a first end region. The second end region is coupled via a pivot point to the first end region of the upper toggle lever. The second end region of the upper toggle lever is attached on the lower storm rod via a further pivot point. The lower storm rod is connected to the upper storm rod via a pivot point, the upper and lower storm rod applying the material tension via the tensioning hoop. The storm rods are driven via the four-rod linkage, and includes the lower toggle lever and the upper toggle lever. As a result, when the tensioning hoop cylinder remains under pressure, the lower toggle lever, which is driven by way of the tensioning hoop cylinder, remains in its position in an unchanged manner as a result. Moreover, the pivot point, which is configured between the lower toggle lever and the upper toggle lever, acts as a positionally fixed pivot point for the remaining adjusting movement of the folding top. The adjusting movement is therefore kinematically determinate at any time.

In accordance with embodiments, the set-up tensioning hoop position may be achieved with less force and may therefore be stabilized. This may be achieved by way of the favourable attachment of the upper toggle lever to the lower storm rod.

DRAWINGS

Embodiments will be illustrated by way of example in the drawings and explained in the description below.

DESCRIPTION

Figure 1:
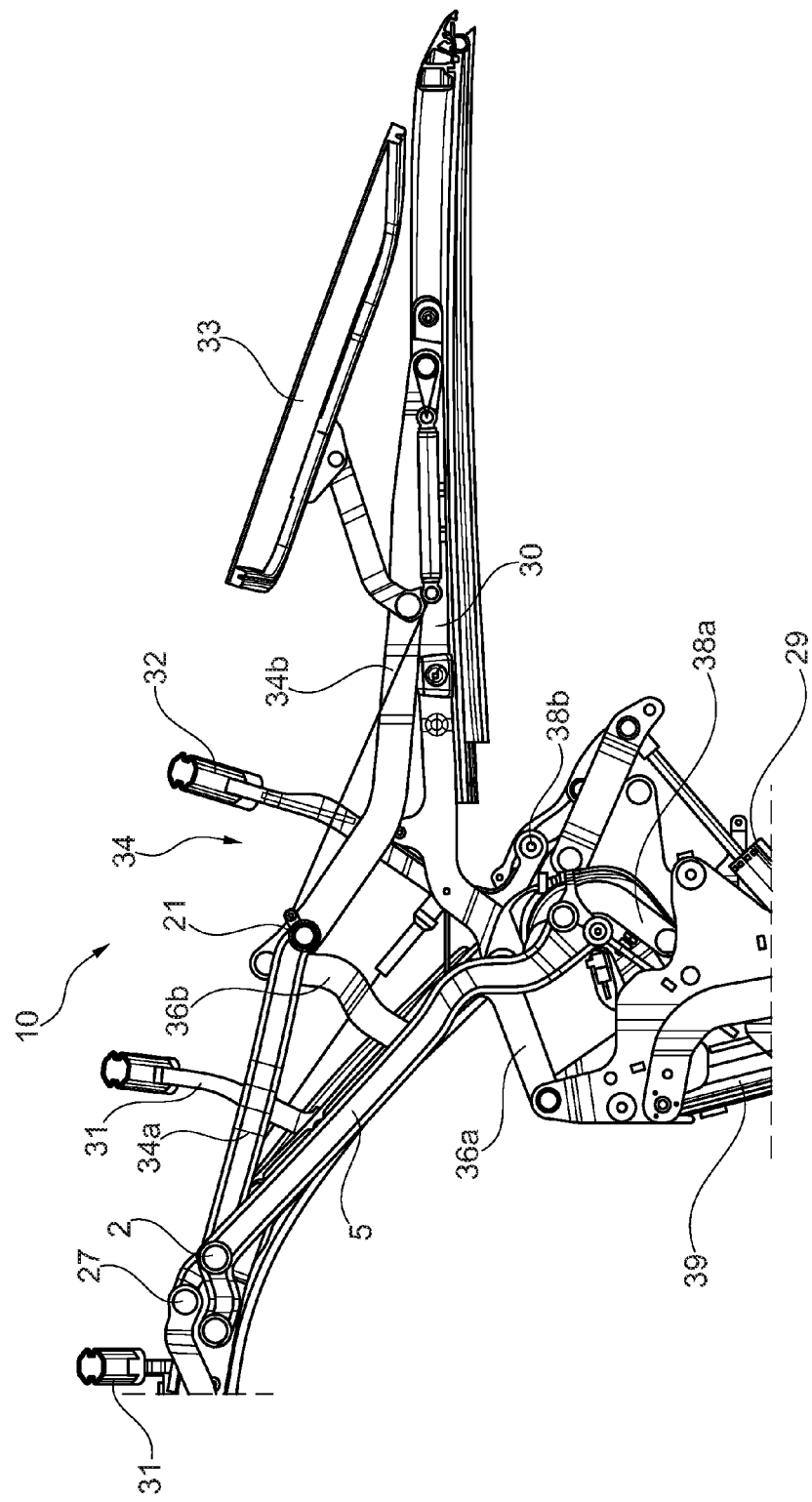
FIG. 1 illustrates a side view of a top linkage when the folding top is in a closed position, in accordance with embodiments.
Figure 2:
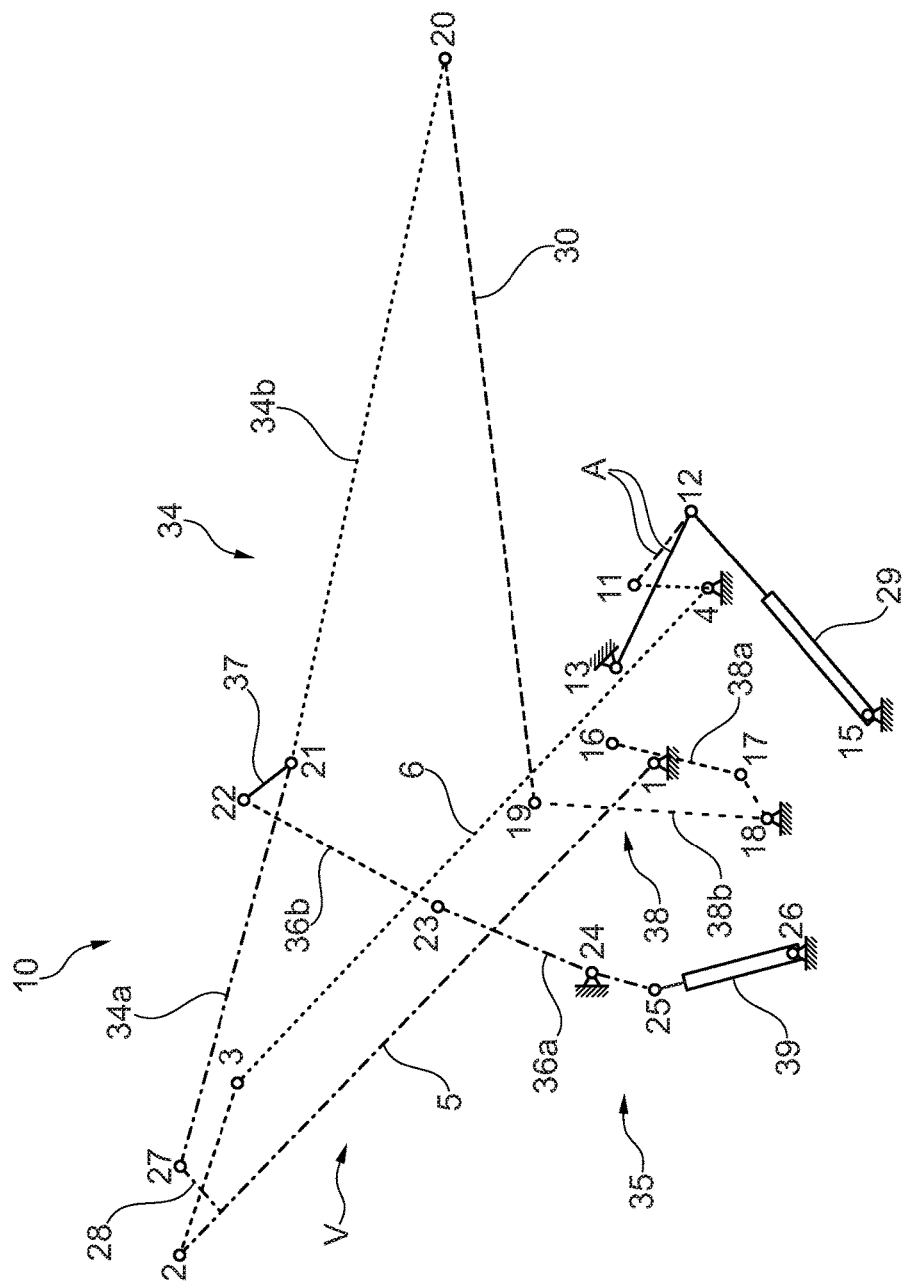
FIG. 2 illustrates the top linkage of FIG. 1 in a simplified kinematic illustration.

As illustrated in FIGS. 1 and 2, a side view of a top linkage 10 in accordance with embodiments, when the folding top is in a closed state or position. As has already been described herein, the folding top may be adjusted between a closed position which covers the vehicle interior space, and an open stowage position in which the folding top may be stowed in a rear-side storage space of the vehicle.

The folding top comprises a top cover and the top linkage 10, on which the top cover is tensioned. The folding top is configured such that it may be adjustably moveable between the abovementioned positions via the top linkage 10 and the roof kinematic system. The roof kinematic system is configured as a four-bar linkage kinematic system V and comprises a pair of roof links 5, 6. One of the roof links 5, 6 is a main link 5, and the second roof link 6 is usually configured as a C-pillar.

The folding top comprises a front roof part which, in the closed position, bears directly against the windscreen frame and may be locked to a windscreen frame via a locking mechanism. The top cover is fastened to the front roof part, which top cover is tensioned in the closed position in the rear region of the folding top by a tensioning hoop 30 which is likewise part of the top linkage 10. The roof part is coupled either directly or via a roof part link 28 to the roof links 5, 6.

The roof links 5, 6 are attached in an articulated manner on a bearing bracket via first end-side bearing points/pivot points 1, 4. The bearing bracket is usually a bearing plate which is fastened to the vehicle body. Furthermore, the roof links 5, 6 have second end-side bearing points/pivot points 2, 3. The bearing points/pivot points 1, 2, 3, 4 are configured on the roof frame centre 28 which connects the roof links 5, 6.

The second roof link 6 is configured so as to be driven via a drive member 29. Here, a hydraulic cylinder comprises the drive member 29. A drive transmission A is connected between the roof link 6 and the piston rod of the drive member 29. The drive transmission A converts the linear movement of the piston rod into a rotational movement about the bearing point 4, on which the roof link 6 is attached.

A plurality of transverse bows 31 which span the folding top in the transverse direction are arranged as further constituent parts of the top linkage 10. Here, the rear bow is configured as a corner bow 32. The vehicle longitudinal direction is indicated by the arrow L in FIG. 1.

A rear window which is integrated into the top cover and is held by a rear window frame 33 is situated in the rear-side region of the folding top between the corner bow 32 and the tensioning hoop 30. The rear window frame 33 is attached in an articulated manner to the top linkage 10 by a rear window frame link 34.

A storm linkage 34 which comprises two storm rods 34a and 34b which are coupled on one another in an articulated manner serves to support the tensioning hoop 30 in the closed position of the folding top. The articulated connection of the storm rods 34a and 34b is formed by the bearing point 21. The front storm rod 34a is attached in an articulated manner at the upper end region of the main link 5 via the bearing point 27. The lower storm rod 34b is attached with its end region which lies opposite the bearing point 21 to the tensioning hoop 30 in an articulated manner via a bearing point 20. In the closed position of the folding top which is shown in FIG. 1, the storm linkage 34 assumes a locked position, in which the tensioning hoop 30 is held and locked in the tensioning position. In this position, the tensioning hoop 30 lies on a storage space cover which covers the storage space for receiving the folding top in the stowage position.

The storm linkage 34 is adjusted between an unlocked and a locked position by way of a control device 35 and/or may be driven via the control device 35. For this purpose, the control device 35 comprises a four-rod linkage 36 which consists of an upper and lower toggle lever 36a, 36b and a drive member 39. The drive member 39 is configured as a hydraulic cylinder and is attached in an articulated manner via a bearing point 26 which is fixed on the vehicle body. The lower and upper toggle lever 36a, 36b are connected to one another in an articulated manner via a bearing point 23.

Furthermore, the lower toggle lever 36a is mounted at its lower end region on the bearing bracket and is coupled in an articulated manner to the piston rod of the hydraulic cylinder at its end region which lies opposite the bearing point 23. The upper toggle lever 36b is attached in an articulated manner via its end region which lies opposite the bearing point 23 on a projection 37 of the lower storm rod 34b via a bearing point 22. Here, the projection 37 is configured as an extension of the lower storm rod 34b in the region of the bearing point 21. In the unlocked position of the storm linkage 34, the tensioning hoop 30 may pivot up out of the unlocked position into the raised released position. In this position, the cover of the storage space may be opened.

It may be seen from the drawings that the tensioning hoop 30 is guided via a tensioning hoop kinematic system 38 and may be adjusted between a position, in which the tensioning hoop 30 lies on the storage space cover (closed position), and the lowered position into the storage space (open position). Furthermore, via the tensioning hoop kinematic system 38, the tensioning hoop 30 may perform an adjusting movement between the locked tensioned position, in which the tensioning hoop 30 is locked by the storm linkage 34, and an unlocked position. In the unlocked position, when the material tension is released, the tensioning hoop 30 may be moved into an upwardly pivoted position.

The tensioning hoop kinematic system 38 comprises a pair of link components which are configured as a coupling link 38a and as a guide link 38b. The coupling link 38a is connected to the main link 5 of the roof kinematic system in an articulated manner via the bearing point 16. The guide link 38b is connected at its first end region to the coupling link 38a via the bearing point 17 and is coupled at its second end region to the first end region of the tensioning hoop 30 in an articulated manner via a bearing point 19. The guide link 38b is mounted pivotably on the top bearing via a further bearing point 18. The second end region of the tensioning hoop 30 is attached on the lower storm rod 34b in an articulated manner via a bearing point 20.

The term "coupled," or "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A folding top for a cabriolet vehicle, the folding top comprising:

a top linkage having a storm linkage, the storm linkage having an upper storm rod and a lower storm rod which are connected to one another in an articulated manner;

a top cover;

a roof kinematic system to move the top linkage between a closed position and an open position, the roof kinematic system being including a four-bar linkage kinematic system having a first link, a second link, and a first drive member to drive the first link;

a tensioning hoop assigned to the top linkage and to which the top cover is connected;

a tensioning hoop kinematic system to move the tensioning hoop and to which the roof kinematic system is connected such that, during a movement of the roof kinematic system, the tensioning hoop performs an adjusting movement, the tensioning hoop kinematic system including a guide link and a coupling link connected in an articulated manner to the second link, a first bearing point to connect the guide link at a first end region to the coupling link in an articulated manner, and a second bearing point to connect the guide link at a second end region thereof to the tensioning hoop in an articulated manner; and a control device to adjustably move the storm linkage between a locked position, in which the tensioning hoop is loaded by the storm linkage, and an unlocked position, the control device including a four-rod linkage and a second drive member, the four-rod linkage having an upper toggle lever and a lower toggle lever which are connected to one another in an articulated manner, the upper toggle lever being connected in an articulated manner to the lower storm rod, and the lower toggle lever being connected in an articulated manner between the second drive member and a body of the cabriolet vehicle.

2. A folding top for a vehicle, the folding top comprising:

a top linkage having a storm linkage, the storm linkage having an upper storm rod and a lower storm rod which are connected to one another in an articulated manner;

a roof kinematic system to move the top linkage between a closed position and an open position;

a tensioning hoop kinematic system to move the tensioning hoop and to which the roof kinematic system is connected such that, during a movement of the roof kinematic system, the tensioning hoop performs an adjusting movement; and a control device to adjustably move the storm linkage between a locked position, in which the tensioning hoop is loaded by the storm linkage, and an unlocked position.

3. The folding top of claim 2, wherein the roof kinematic system comprises a four-bar linkage kinematic system.

4. The folding top of claim 3, wherein the four-bar linkage kinematic system comprises having a first link, a second link, and a first drive member to drive the first link.

5. The folding top of claim 4, wherein the tensioning hoop kinematic system comprises a guide link and a coupling link connected in an articulated manner to the second link.

6. The folding top of claim 4, wherein the control device comprises a four-rod linkage and a second drive member.

7. The folding top of claim 6, wherein the four-rod linkage comprises an upper toggle lever and a lower toggle lever which are connected to one another in an articulated manner.

8. The folding top of claim 7, wherein the upper toggle lever is connected in an articulated manner to the lower storm rod.

9. The folding top of claim 7, wherein the lower toggle lever is connected in an articulated manner to the second drive member, and also connected in an articulated manner to a body of the vehicle.

10. A vehicle, comprising:
a vehicle body;
a folding top operatively connected to the vehicle body, the folding top including:
a top linkage having a storm linkage, the storm linkage having an upper storm rod and a lower storm rod which are connected to one another in an articulated manner;
a roof kinematic system to move the top linkage between a closed position and an open position;
a tensioning hoop kinematic system to move the tensioning hoop and to which the roof kinematic system is connected such that, during a movement of the roof kinematic system, the tensioning hoop performs an adjusting movement; and
a control device to adjustably move the storm linkage between a locked position, in which the tensioning hoop is loaded by the storm linkage, and an unlocked position.

11. The vehicle of claim 10, wherein the roof kinematic system comprises a four-bar linkage kinematic system.

12. The vehicle of claim 11, wherein the four-bar linkage kinematic system comprises having a first link, a second link, and a first drive member to drive the first link.

13. The vehicle of claim 12, wherein the tensioning hoop kinematic system comprises a guide link and a coupling link connected in an articulated manner to the second link.

14. The vehicle of claim 11, wherein the control device comprises a four-rod linkage and a second drive member.

15. The vehicle of claim 14, wherein the four-rod linkage comprises an upper toggle lever and a lower toggle lever which are connected to one another in an articulated manner.

16. The vehicle of claim 15, wherein the upper toggle lever is connected in an articulated manner to the lower storm rod.

17. The vehicle of claim 15, wherein the lower toggle lever is connected in an articulated manner to the second drive member, and also connected in an articulated manner to the vehicle body.

* * * * *